United States Patent [19]

Tetrault

[11] Patent Number: 5,082,019
[45] Date of Patent: Jan. 21, 1992

[54] CALIBRATED QUICK SETTING MECHANISM FOR AIR PRESSURE REGULATOR

[75] Inventor: Leonard P. Tetrault, Northport, N.Y.

[73] Assignee: Aerodyne Controls Corporation, Ronkonkoma, N.Y.

[21] Appl. No.: 675,873

[22] Filed: Mar. 27, 1991

[51] Int. Cl.⁵ ............................................ G05D 16/06
[52] U.S. Cl. .................................. 137/505.38; 251/248
[58] Field of Search ...................... 137/505.38, 505.42; 74/424.8 VA; 251/248

[56] References Cited

U.S. PATENT DOCUMENTS

| | | | |
|---|---|---|---|
| 1,784,094 | 12/1930 | Fletcher | 251/248 |
| 2,025,244 | 12/1935 | Morehead et al. | 251/248 X |
| 2,984,252 | 5/1961 | Bryant | 137/505.42 X |
| 3,856,042 | 12/1974 | Fletcher et al. | 137/505.42 |
| 4,093,180 | 6/1978 | Strabala | 251/248 |

FOREIGN PATENT DOCUMENTS 44013 1/1982 European Pat. Off. ............ 251/248

Primary Examiner—Stephen M. Hepperle
Attorney, Agent, or Firm—Edward H. Loveman

[57] ABSTRACT

A mechanism for instantly and accurately adjusting pressure of air passed by a pressure regulator with a valve assembly controlled by a flexible diaphragm. A compressed coil spring bears on the diaphragm. A non-rotating spring guide plate bears on the coil spring. A pinion shaft has a threaded end engaged with a threaded portion of the spring guide plate to move it axially of the coil spring. A pinion gear on the shaft is engaged by spur gears which are in turn engaged by a ring gear. Rotation of the ring gear advances and retracts the spring guide plate axially of the coil spring. A knob ring disposed adjacent a stationary calibrated pressure scale and secured to the ring gear, indicates the pressure of air passed by the regulator for each position of the knob ring around the scale.

8 Claims, 4 Drawing Sheets

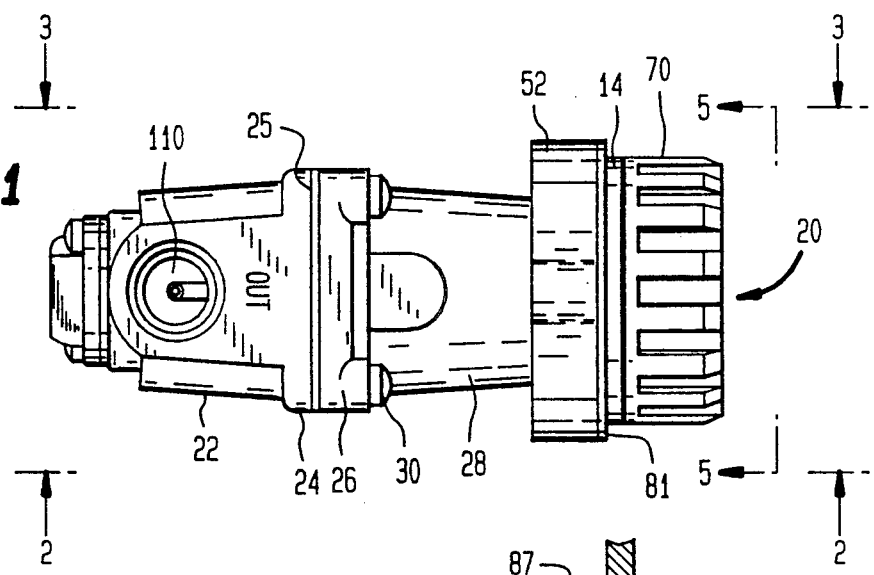
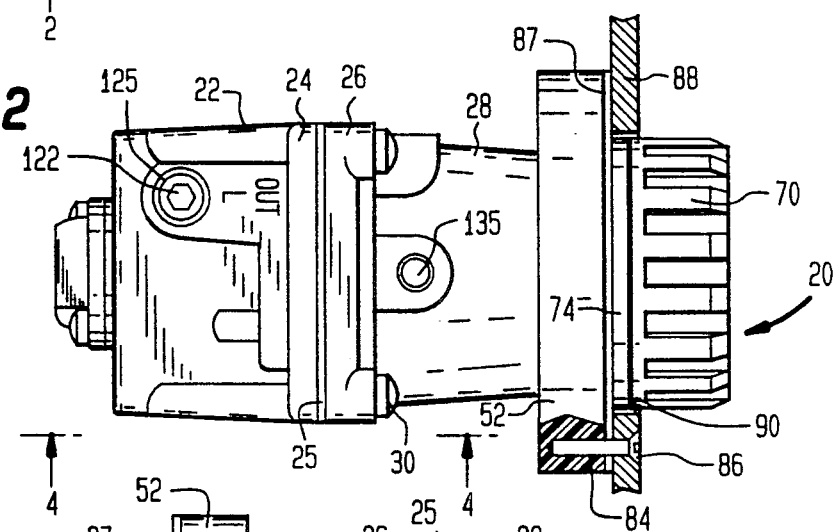
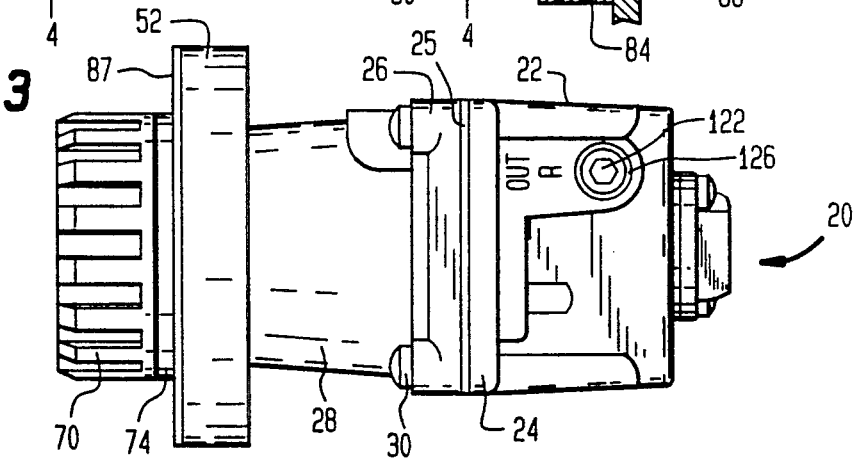
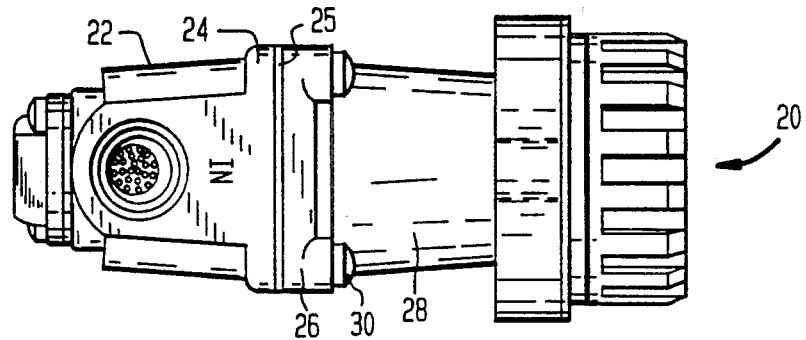

CALIBRATED QUICK SETTING MECHANISM FOR AIR PRESSURE REGULATOR

BACKGROUND OF THE INVENTION

1. Field of the Invention

This invention relates to the art of manually adjustable regulators for maintaining a set air pressure in a pneumatic system and more particularly concerns a calibrated quick setting manual adjustable regulator for maintaining a set air pressure in a pneumatic system.

2. Description of the Prior Art

Manually adjustable regulators for air pressure in pneumatic systems are well known and are widely used in industry. Conventional pressure regulators generally utilize a hand operated screw to set the regulator and a pressure gauge to determine that the proper pressure has been set. Manually adjusting the air pressure is thus a slow laborious process with conventional pressure regulators. A typical conventional pressure regulator is one manufactured by Fairchild Products Company of Winston-Salem, N.C. Model No. 30243. This regulator has a casing or housing in which is a valve assembly arranged to receive air under pressure from a compressor or other source of air pressure. The valve assembly passes air to outlets from the casing. In the casing is a flexible gasket or diaphragm carrying a valve member which opens and closes with a poppet member or pintle in the casing. The diaphragm is loaded by a compressed coil spring located in a bonnet secured to the casing. The degree of compression of the spring is determined by pressure axially exerted on the spring by a screw in the bonnet which is turned by a manually operated knob. It is this knob and the associated parts which control or set the outlet pressure from the regulator. Some objections to this simple, crude means for adjusting and setting the outlet air pressure are mentioned hereinabove.

SUMMARY OF THE INVENTION

It is a principal object of the present invention to provide a calibrated quick setting mechanism for a pneumatic system by manually adjusting the outlet pressure of an air pressure regulator in the system, instantly and precisely, without requiring an auxiliary pressure gauge, whenever it becomes necessary to change the air pressure in the system.

According to the invention, the mechanism has a manually rotatable adjustment knob which rotates less than a full turn to effect adjustment of air outlet pressure of the regulator to any desired magnitude in a preset range i.e. 0 PSI to 45 PSI. The mechanism includes a gear train comprising a ring gear secured to the adjustment knob, a pair of spur gears driven by the ring gear and a pinion gear driven by the spur gears. The pinion gear is located at one end of an axial pinion shaft, which carries a fine pitch screw at its other end. The screw is engaged with a threaded nipple integral with a spring pressure plate. The plate bears on one end of a compressed coil spring in the bonnet of the regulator and effects a change in the outlet pressure of the regulator when the manually rotatable adjustment knob is rotated. A calibrated scale is mounted in stationary position adjacent the adjustment knob to indicate the outlet pressure of the regulator for each rotatable position of the adjustment knob. Thus, to obtain a desired pressure setting for the regulator, it is simply necessary to turn the adjustment knob to the desired position on the calibrated scale, and the desired outlet pressure is instantly and accurately obtained.

These and other objects and many of the attendant advantages of this invention will be readily appreciated as the same becomes better understood by reference to the following detailed description when considered in connection with the accompanying drawings in which:

BRIEF DESCRIPTION OF THE DRAWINGS

FIG. 1 is a top plan view of a pressure regulator on which is mounted a pressure adjustment mechanism embodying the invention;

FIG. 2 and FIG. 3 are left and right side elevational views taken along lines 2—2 and 3—3 respectively of FIG. 1;

FIG. 4 is a fragmentary bottom plan view taken along line 4—4 of FIG. 2;

Figure 5:
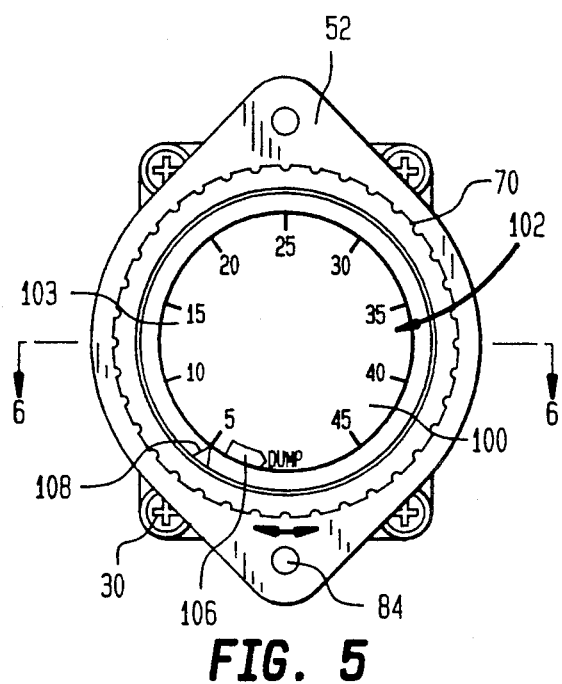
FIG. 5 is an end elevational view taken along line 5—5 of FIG. 1.

Referring now to the drawings wherein like reference characters designate like or corresponding parts throughout, there is illustrated in FIGS. 1—6 a pressure regulator designated generally by reference numeral 20. The regulator 20 has a casing 22 at its rear end which is formed with a rectangular flange 24. Abutted to the flange 24 with a flexible gasket or diaphragm 25 therebetween is a rectangular flange 26 of a tapered bonnet 28. Four screws 30 hold the casing 22 and the bonnet 28 in an axially aligned rigid assembly. Inside a cavity 29 in the bonnet 28 is a compressed coil spring 32; see FIG. 6. The spring 32 bears on a centrally apertured flange 34 which is threaded on a valve member rearwardly of the diaphragm 25. To the extent described, the regulator structure is conventional.

Figure 8:
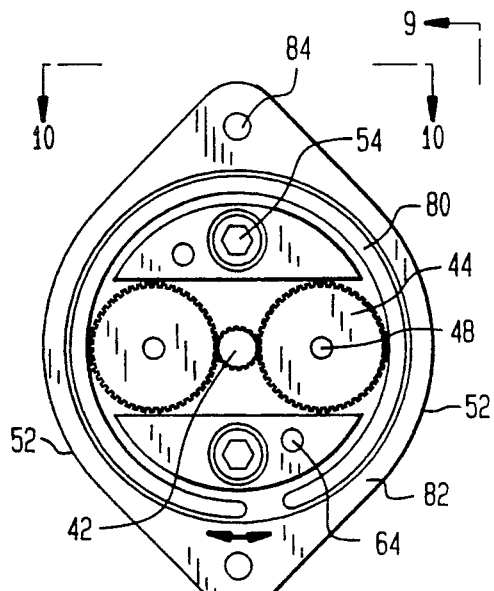
FIG. 8 is an end elevational view of the pressure adjustment mechanism per se, with gear guide plate and calibrated pressure scale removed.
Figure 10:
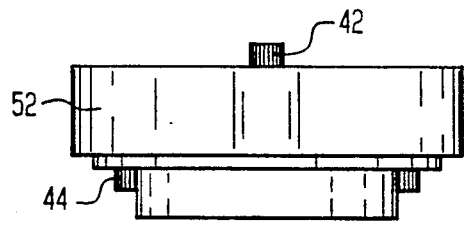
FIG. 10 is a plan view taken along line 10—10 of FIG. 8.
Figure 9:
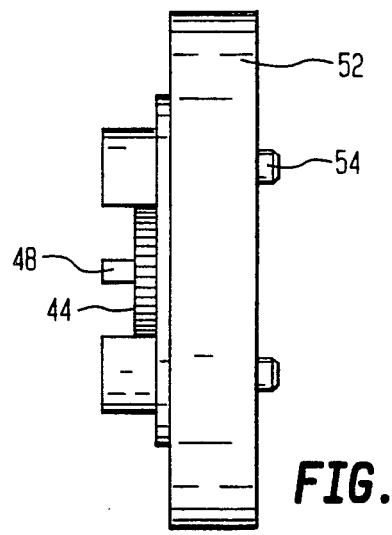
FIG. 9 is a side elevational view taken along line 9—9 of FIG. 8.
Figure 7:
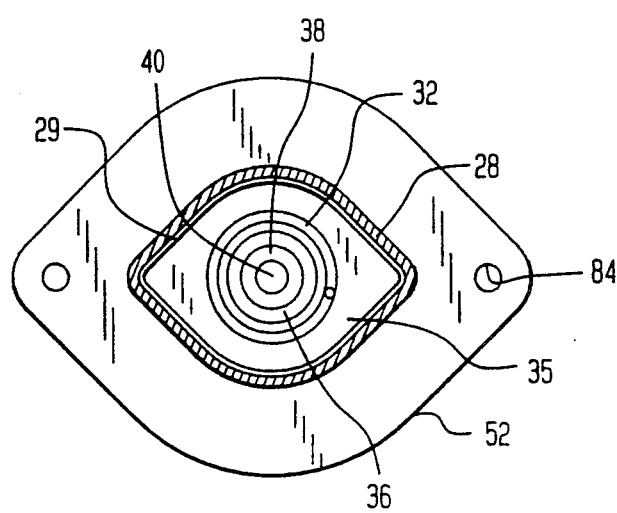
FIG. 7 is a reduced cross sectional view taken along line 7—7 of FIG. 6.
Figure 15:
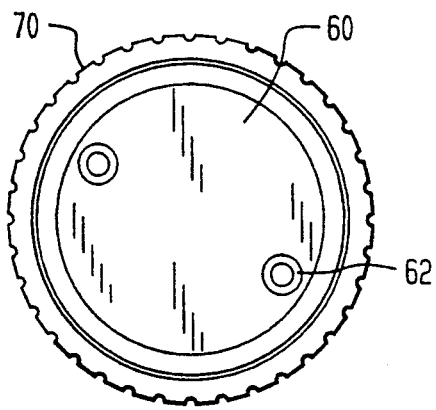
FIG. 15 is a front elevational view of the adjustment mechanism with gear guide plate in place, but with calibrated scale removed.
Figure 16:
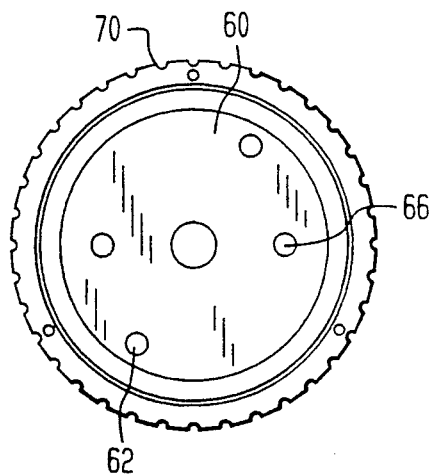
FIG. 16 is a rear elevational view of part of the mechanism showing the knob ring and gear guide plate.
Figure 17:
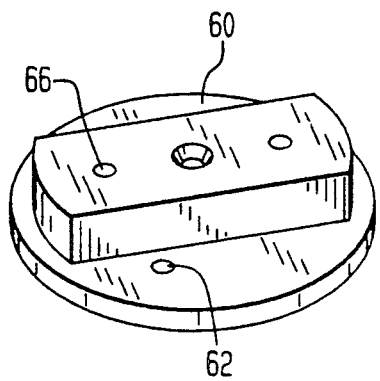
FIG. 17 is a perspective view of the gear guide plate in an inverted position.

Now according to the invention, there is provided a novel mechanism for axially compressing and expanding the spring 32 to vary the air pressure applied from a compressor and delivered to a pneumatic system via the regulator 20. The bonnet 28 is noncircular in cross section as best shown in FIG. 7. Inside the cavity 29 is a noncircular, rather elongated spring plate 35 whose shape corresponds to the cross sectional shape of the bonnet 28. The plate 35 is formed with an integral internally threaded axial nipple 37 and can only move axially of the bonnet 8, as hereinafter described. Engaged with internally threaded nipple 37 is a fine pitched screw 38 secured to a pinion shaft 40. The screw 38 can rotate with the shaft 40 but does not move axially. Instead, the plate 35 moves axially forwardly and rearwardly depending on the direction of rotation of the pinion shaft 40. The shaft 40 terminates in an integral pinion gear 42 at its forward end. The pinion gear 42 is engaged by two spur gears 44, journaled to rotate freely on respective stub shafts 48. The rear ends of the shafts 48 are rotatably seated in cavities or recesses 50 25 formed in a stationary gear track block 52. The block 52 is secured to the bonnet 28 by two screws 54 (see FIG. 8) engaged in respective threaded holes in a forward annular wall 58 of the bonnet 28. At the front of the block 52 is a stationary gear guide plate 60; see FIGS. 6, 15, 16 and 17. The plate 60 is held 30 by screws (not shown) engaged in countersunk holes 62 in the plate 60 and in threaded holes 64 formed in the block 52; see FIGS. 8 and 15. Forward ends of the stub shafts 48 are journaled in recesses 66 formed in the rear side of the gear guide plate 60. Surrounding the gear guide plate 60 is a manually rotatable knob ring 70; see FIGS. 1-3, 5- 10 and 15-16. The knob ring 70 has an internal annular lip or ledge 72 in the front of which bears around the periphery of the plate 60; see FIG. 6. The plate 60 holds the knob ring 70 axially and rotatably on the assembly 20. Secured to the rear of the knob ring 70 is a flat ring gear 74; see FIGS. 6 and 11-14. The gear 74 has internal teeth 75 which engage the two spur gears 44. The ring gear 74 has three forwardly extending pins 76 engaged in recesses in the rear side 73 of the knob ring 70 so that the ring gear 74 and knob ring 70 rotate together as one unit. A single pin 78 extends rearwardly from the ring gear and fits into a shallow arcuate track or groove 80 in a forward side 82 of the block 52; see FIG. 6. The track 80 extends less than 360° around the forward block face or side 82 as clearly shown in FIG. 8. Two holes 84 are formed in extended ends of the block 52 and each receives a screw 86 which extends through a gasket 87 for mounting the regulator 20 on a stationary support plate 88; see FIG., 2. The plate 88 has a hole 90 through which extends the knob ring 70 so that it can be manually rotated to operate the adjustment mechanism of the regulator 20.

On the front end of the gear guide plate 60 is a circular label 100; see FIG. 5. On this label is a scale 102 extending less than 360° around the label. The scale 102 may have pressure settings 103 indicating air pressures ranging from 5 PSI to 45 PSI, for example. Counterclockwise of the lowest pressure indication 5 PSI is a scale marking 106, reading "DUMP". The knob ring 70 rotates less than 360° around the scale 102 and has an index mark or arrow 108 to indicate the pressure setting of the regulator 20 at each position of rotation of the knob ring 70. If desired a thrust bearing or thrust washer 111 may be inserted on the shaft 40 between the block 52 and the screw 38 to minimize the rotating friction.

Figure 6:
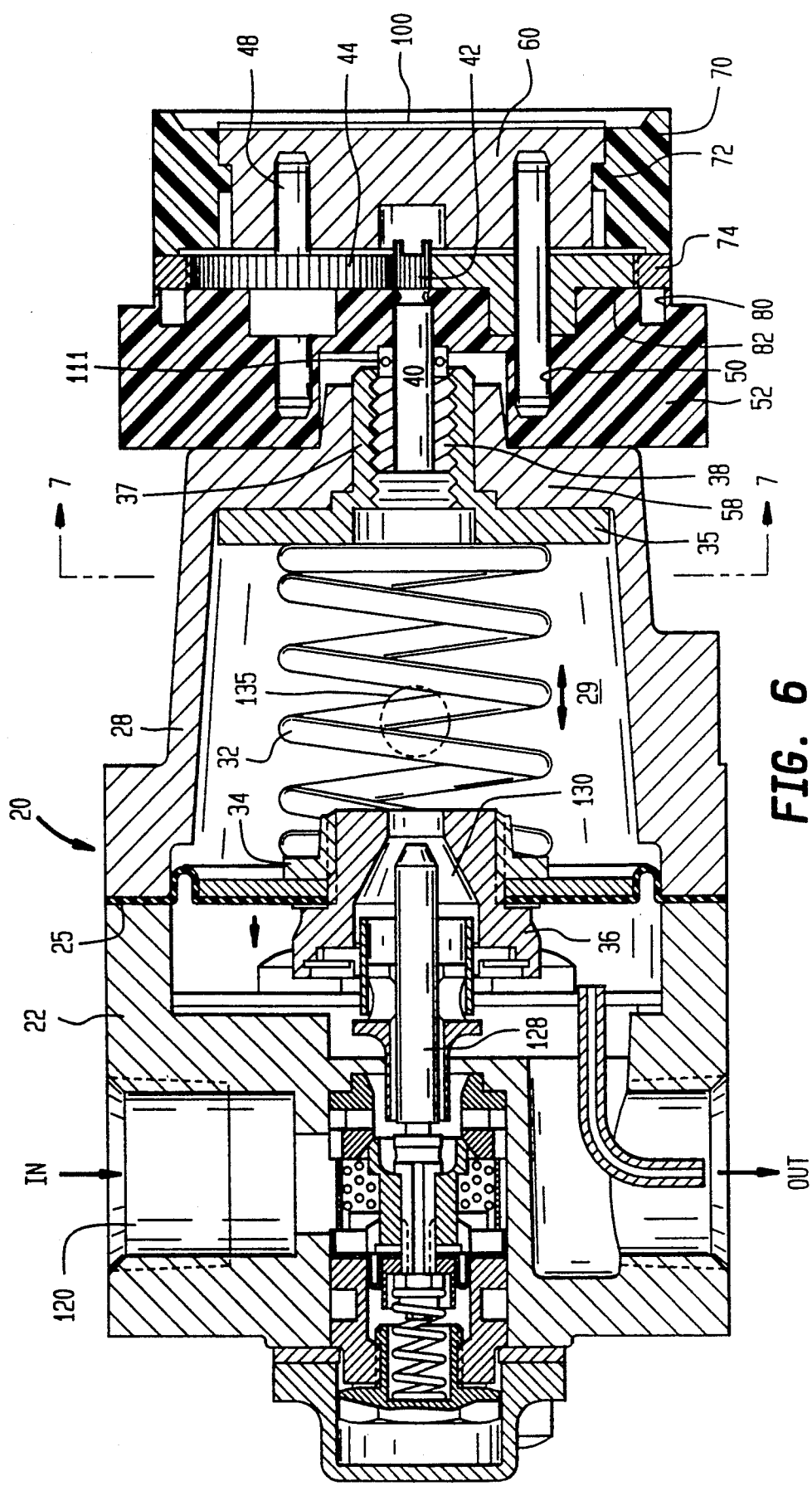
FIG. 6 is an enlarged axially sectional view taken along line 6—6 of FIG. 5.
Figure 11:
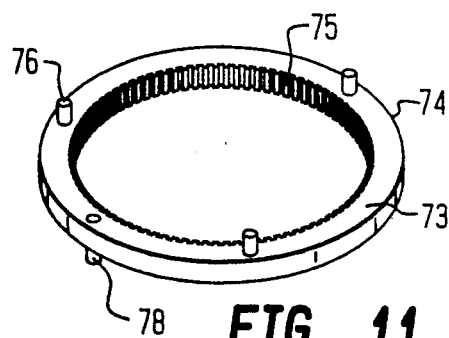
FIG. 11 is a perspective view of the ring gear per se.
Figure 12:
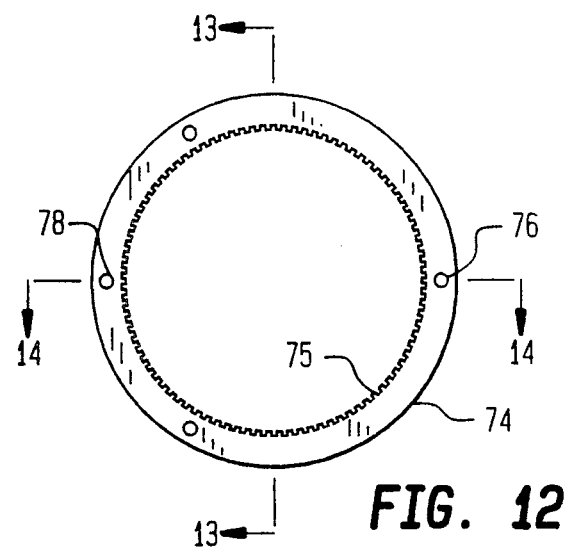
FIG. 12 is a front elevational of the ring gear.
Figure 13:
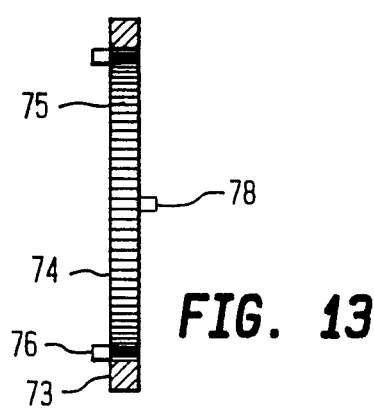
FIG. 13 and FIG. 14 are cross sectional views taken along lines 13—13 and 14—14 of FIG. 12.
Figure 14:
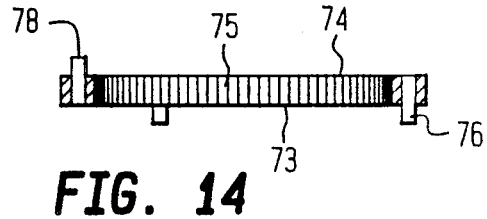

To calibrate the regulator 20, it is assembled as show in FIG. 6, except the ring knob 70, the gear guide plate 60 and the ring gear 74 are removed. The ring gear 74 is replaced by an identical ring gear having no pin 78 to extend into the track 80 of the block 52. A source of compressed air is connected to the inlet opening 120 in the casing 22. One of the screws 122 shown in FIGS., 2 and 3 may be removed from one of the ports 125, 126 and an air pressure gauge attached at the open outlet or if desired the air pressure gage may be connected to the outlet port 110. Air pressure is applied at the inlet 120 and the replacement ring gear 74 is rotated until the pressure gauge reads a desired low pressure, for example, 5 PSI. Then the replacement ring gear is removed and the ring gear 74 having a pin 78 to extend into track 80 is installed. Knob ring 70 is installed on the ring gear 74. Then the gear guide plate 60 is installed and secured in place on the block 52 by holding the screws. Then the label 100 is applied to the front face of the plate 60 with the 5 PSI scale mark adjacent the index or arrow 108 on the knob ring 70 as shown in FIG. 5. This completes the calibration of the regulator 20. When the knob ring 70 and ring gear 74 are rotated it will be noted that the pressure gauge at outlet 125 or 126 indicates substantially the same pressure as indicated by index element 108 along the scale 102. The pressure gauge and compressed air source can now be removed and the regulator will be ready for installation in a system.

In a conventional system installation, two regulators will be installed respectively at a first and second branch of the system. Each regulator will control air pressure applied to a branch. An air compressor or other compressed air source will be connected to inlet 120 of each regulator and conduits will connect the air outlets 125, 126 to respective branches. The valve mechanism in casing 22 of the regulator operates in conventional manner so no detailed description is required here. However, it may be noted that the position of valve member 36 with respect to valve pintle 128 determines the size of air passage 130 through the valve. The position of valve member 36 axially of casing 22 is determined by the axial pressure exerted by the coil spring 32, which as pointed out above is increased or decreased depending on the direction of rotation of pinion shaft 40 and axial movement of the plate 35 pressing on the forward end of coil spring 32.

If the knob ring 70 is turned to the "DUMP" position 106 on scale 102 shown in FIG. 5 air in the system branches is instantly released and discharged via the regulator through air release outlet 135 in the bonnet 28 shown in FIGS. 2 and 6.

From the foregoing description it will be apparent that rotation of the knob ring 70 and ring gear 74 to any selected pressure indicated on scale 102 instantly and automatically adjusts the air pressure applied to the system branches via the outlets 110, 125 or 126. The adjustment of the knob ring and ring gear is accomplished with less than 360° of rotation for quick setting of the desired pressure.

It should be understood that the foregoing relates only to a limited number of preferred embodiments of the invention which have been by way of and that it is intended to cover all changes and modifications of the examples of the invention herein chosen for the purpose of the disclosure, which do not constitute departures from the spirit and scope of the invention.

What is claimed is:

1. A valve adjustment mechanism for an air pressure regulator, comprising:
   a bonnet;
   a valve operating coil spring in said bonnet;
   a valve operating means having one end abutting one end of said coil spring;
   a spring plate disposed nonrotatably in said bonnet and abutting the other end of said coil spring, said plate having an internally threaded central portion;
   a rotatable pinion shaft having a threaded end engaged with said threaded central portion of said pressure plate, for moving said pressure plate axially of aid coil spring when said pinion shaft is turned;

a gear train operatively engaged with said pinion shaft to rotate the same for moving said pressure plate axially of said coil spring, to adjust the pressure exerted thereof on said valve operating means and thereby adjust the pressure of air passed by said valve; and a knob ring engaged with said gear train for manually rotating the same, said bonnet having means for limiting rotation of said knob ring to less than 360° for quickly and instantly setting said regulator to pass air at selected pressure therethrough.

2. A valve adjustment mechanism as claimed in claim 1, wherein said gear train comprises a pinion gear at the other end of said pinion shaft, spur gear means engaged with said pinion gear, and a ring gear engaged with said spur gear means; and wherein said knob ring engaged with said ring gear for manually rotating the same to rotate said pinon shaft.

3. A valve adjustment mechanism as claimed in claim 2, further comprising means carrying a stationary calibrated pressure scale adjacent said knob ring, whereby rotation of said knob ring to any angular position with respect to said scale sets said regulator to pass air at a selected pressure therethrough.

4. In a mechanism for adjusting an air pressure regulator of the type having a valve controlled by a flexible diaphragm movable in a casing by varying axial compression of a coil spring bearing on said diaphragm and disposed axially in a bonnet secured on said casing, the improvement comprising:

a spring guide plate disposed nonrotatably in said bonnet and bearing on said coil spring to compress the same, said spring guide plate having an axially threaded central portion;

a rotatable pinion shaft having a threaded end engaged with said threaded central portion of said spring guide plate, for moving said spring guide plate axially of said coil spring when said pinion shaft is turned;

a gear train, operatively engaged with said pinion shaft to rotate the same and move said pressure plate axially of said coil spring, and thereby move said diaphram to open and close said valve;

a knob ring means coupled to said gear train for manually rotating the same and thereby adjust the air pressure from said regulator; and means on said bonnet for limiting rotation of said knob ring to less than 360° for quickly and accurately adjusting the air pressure from said regulator.

5. In a mechanism for adjusting an air pressure regulator of the type having a valve controlled by a flexible diaphragm movable in a casing by varying axial compression of a coil spring bearing on said diaphragm and disposed axially in a bonnet secured on said casing, the improvement comprising:

a spring guide plate disposed nonrotatably in said bonnet and bearing on said coil spring to compress the same, said spring guide plate having an axially threaded central portion;

a rotatable pinion shaft restrained against axial movement in said bonnet, said shaft having a screw at one end engaged in said threaded portion of said spring guide plate to move said spring guide plate axially in said bonnet against tension in said coil spring, when said pinion shaft rotated, said pinion shaft having a pinion gear at its other end;

a stationary block on said bonnet;

spur gears rotatably mounted on said block and engaged with said pinion gear to rotate said pinion shaft;

a ring gear rotatable selectively in clockwise and counterclockwise directions and guided by said block, said ring gear having teeth engaged with said spur gears to rotate the same and to turn said pinion shaft, whereby said spring guide plate advances and retracts axially in said bonnet to vary the spring load exerted by said coil spring on said diaphragm to open and close said air valve;

a knob ring engaged with said ring gear for rotating the same; and a stop means on said block for limiting rotation of said knob ring to less than 360° for quickly and accurately adjusting the air pressure from said regulator.

6. A mechanism as claimed in claim 5 further comprising:

a stationary gear guide plate secured to said block and rotatable holding said knob ring and said spur gearts on said block, whereby rotation of said knob ring moves said spring guide plate axially in said bonnet, via said said spur gears and said pinion shaft.

7. A mechanism as claimed in claim 6, wherein said stop means comprise an arcuate track in one side of said block facing said ring gear, said ring gear having a pin extending axially into said track;

whereby rotation of said knob ring and ring gear is limited by the arcuate extent of said track, so that a total rotation of said knob ring and ring gear of less than 360° rotates said spur gears several times which rotates said pinion shaft many times, to advance and retract said spring guide plate in said bonnet.

8. A mechanism as claimed in claim 7, further comprising a graduated pressure scale on said gear guide plate, and an index element on said knob ring adjacent said scale;

whereby said index element and said scale accurately indicate the pressure of air passed by said valve at all calibrated positions of said index element around said scale.

* * * * *